United States Patent Office 3,087,240
Patented Apr. 30, 1963

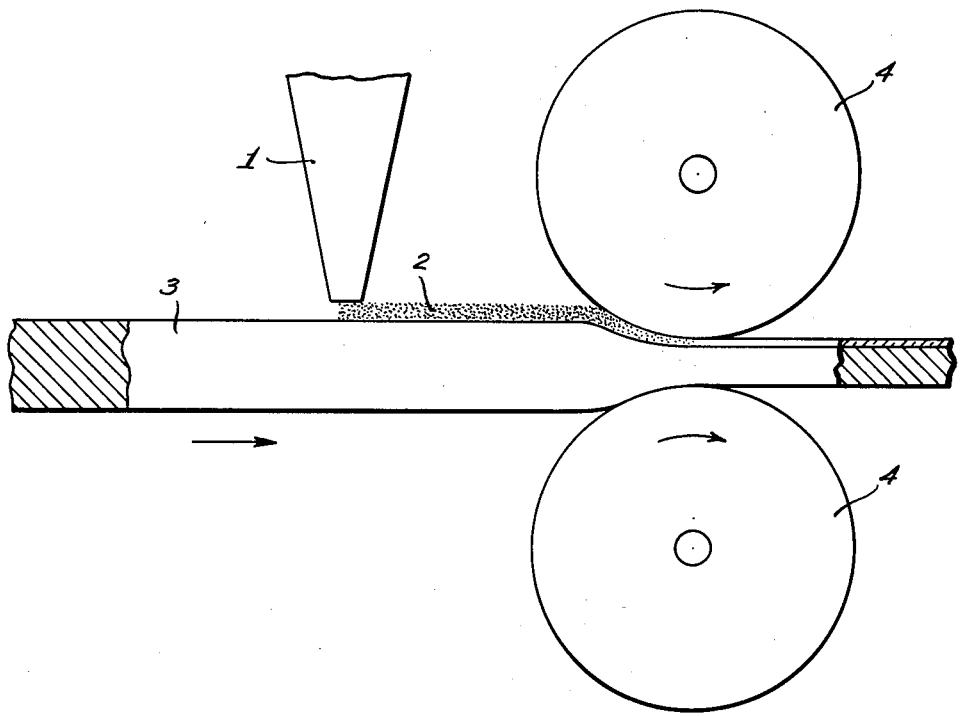

3,087,240
METHOD OF MAKING CERAMIC-TO-METAL
COMPOSITE STOCK
Marshall W. Gross, Attleboro, Mass., assignor to Texas
Instruments Incorporated, Dallas, Tex., a corporation
of Delaware
Filed Sept. 29, 1958, Ser. No. 764,136
13 Claims. (Cl. 29—528)

This invention relates to methods of making ceramic-to-metal composite stock. More particularly, the methods and products of this invention involve the provision of composite stock comprising a layer of ceramic material bonded to a layer of metal by squeezing together a frangible ceramic material and a layer of malleable metal.

An object of this invention is the provision of improved composite stock comprising a layer of ceramic material bonded to a layer of metal and the provision of improved methods of making such composite stock.

Another object of the invention is the provision of making such composite stock having improved properties and characteristics.

A further object of this invention is the provision of methods of making such composite stock which methods lend themselves well to continuous production of comparatively long lengths of the composite stock, which permit the forming of such composite stock to very close thickness tolerances, and which are inexpensive and dependable.

Further objects will become apparent as the description proceeds.

The invention accordingly comprises the structures, steps and sequences of steps, and features of structure and manipulation, all of which will be exemplified in the products and methods hereinafter described, and the scope of the application of which will be indicated in the following claims.

In the accompanying drawing, the FIGURE is a more or less diagrammatic view showing a ceramic material in particulate form being deposited on a length of metal and bonded thereto under the squeezing action of a pair of rolls.

In preparing a ceramic material and a metal to be bonded together according to the methods of this invention, the ceramic material and metal should be free of grease and any other bond-deterring contaminants. No involved preparation of the surface of the metal layer to be bonded is necessary. In most cases, the surface of the metal layer to be bonded is satisfactorily cleaned by scratch brushing or otherwise abrading, and, oftentimes, metal stock taken from the shelf can be bonded as it is by the methods of this invention. The cleaning required for the instant invention is, for the most part at least, substantially less than that required by other bonding methods such, for example, as by firing to fuse the ceramic to the metal and by molten ceramic spraying techniques. In contradistinction to the methods of the invention, these latter conventional methods often require the provision of a flash coating of material such as nickel on the metal surface to be bonded, and usually these latter methods require a chemically clean metal surface prepared, for example, by pickling the surface to be bonded with acid.

The methods of this invention include the steps of disposing frangible ceramic material against a surface of a malleable metal layer, and rolling the two together with a sufficient reduction to provide a layer of the ceramic material bonded to a layer of the metal. The ceramic material may be deposited on the metal surface to be bonded by superposing the former as an integral sheet, as large coarse particles, or as flaked or powdered material. When the ceramic material is in powdered form, it can be mixed with a carrier such as water to provide a slurry which can then be sprayed onto the metal surface and the carrier evaporated off prior to squeezing. It may be advantageous in some cases to deposit the ceramic material on the metal layer prior to squeezing by spraying the ceramic material in molten form. It is preferred in many cases that the ceramic material be deposited in particulate form on the metal preparatory to squeezing together (for ease of acceptance of the material by the reducing rolls). In any case, the ceramic material is pulverized under the action of the reducing rolls to the extent it is not already pulverized when deposited on the metal layer preparatory to squeezing, and this is what is meant herein when it is stated that the ceramic material is "frangible."

Referring to the figure of the drawing, a hopper 1 is shown by which particulate ceramic material 2 is deposited over the surface of a layer of metal 3. The ceramic material 2 and the length of metal 3, moving in the direction of the arrow in this figure, are squeezed together by rolls 4, 4. The ceramic material, being frangible, will be pulverized during this squeezing to the extent it is not already pulverized when deposited on the metal layer preparatory to squeezing. The amount of reduction by rolling required to effect a bond between the ceramic material and the metal varies with the particular respective components, but this, of course, is readily determinable for any given set of components by actually rolling the latter together. In most cases, a reduction of approximately 50% is required to produce a layer of ceramic material bonded to a layer of a metal sufficiently well that the bond will not be disrupted by normal handling or slight bending. In most cases, a total reduction of 80% to 85% results in a sufficiently good bond between the ceramic material and the metal that the composite stock can be severely mechanically worked such as by drawing, milling, spinning, etc. without disruption of the bond. Composite stock according to the invention which has been rolled with total reductions greater than 80% to 85% (as compared to those rolled together with reductions less than 80% to 85%) can be more severely mechanically worked without disruption of the bond or loss of ceramic material.

The ceramic material of the composite stock of this invention is in the form of a continuous layer as distinguished from separate bits or pieces individually bonded to the metal layer. It must therefore be assumed that the minute particles of pulverized ceramic material (the ceramic material having been pulverized during the reduction by rolling to the extent it is not already pulverized when deposited on the metal layer preparatory to squeezing) bond not only to the metal layer but to each other as a result of the final reduction by rolling. It will be apparent then that the ceramic material will be pulverized either prior to reduction by rolling or at an intermediate stage of the reduction by rolling and that the ceramic material will be in the form of a continuous layer after the final reduction by rolling.

It has been discovered that the total reduction by rolling to effect the bond between the ceramic material and the metal layer need not be carried out in a single reduction by squeezing step but rather can be carried out with a plurality of successive, cumulative reductions by rolling. That is, to bond a ceramic material to a layer of metal by a reduction of 87.5%, for example, this reduction can be effected by three successive reductions by rolling, each of 50%. Ordinarily, the successive reductions by rolling can be accompanied by intermediate annealing steps where desired or required to render the metal layer more malleable, for example.

Many different ceramic materials have been successfully bonded to metal by the reduction by rolling method of this invention as described above, these including firebrick, a number of varieties of commercial chinaware and pottery, talc, kaolinite, black tourmaline, chrome oxide, magnesium oxide, aluminum oxide, pure silica, iron oxide, heat-shock and chemical-resistant glass (approximately 80.5% silicon oxide, 12.9% boron oxide, 3.8% sodium oxide, 0.4% potassium oxide and 2.2% aluminum oxide; sold under the trademark Pyrex), common window plate glass, common bottle glass, electric light bulb glass (58.50% silicon oxide, 12.35% sodium oxide, 27.40% lead oxide and 1.75% boron oxide), and a host of high-temperature firing enamels. Illustrating the fact that the ceramic material can be formed of a ceramic mixed with other constituents so long as the whole retains sufficient of the bonding characteristics of the ceramic alone is the successful bonding of cermets such, for example, as 60% nickel mixed with 40% alumina by the reduction by rolling method described above. To demonstrate that the ceramic material need not be applied to the metal in particulate form preparatory to the rolling step, standard grade hemacytometer cover glasses 20 mm. x 26 mm. x 0.5 mm. and sections of ordinary plate glass were bonded to layers of a number of malleable metals merely by placing the former on the latter and rolling them together as described herein.

Among the many metals to which ceramics have been successfully bonded by the reduction by rolling method of the invention are fine silver, coin silver, molybdenum, lead, aluminum, copper, 14 karat gold, brass, nickel, several kinds of steels including carbon steel and stainless steel, Invar (an alloy of 36% nickel, remainder iron), 18% Nickel Silver (alloy of 65% copper, 18% nickel and 17% zinc), a glass sealing alloy (20% nickel, 17% cobalt, 0.2% manganese and remainder iron; sold under the trademark Kovar), a manganese alloy having a high coefficient of thermal expansion (72% manganese, 18% copper and 10% nickel), and a high nickel-copper alloy sold under the trademark Monel. Without exception, every ceramic material attempted to be bonded to a malleable metal and every malleable metal to which a ceramic material was attempted to be bonded was successfully bonded by the reduction by rolling method described herein; this without the application of any heat other than that which developed under the action of the reducing rolls. The metal to which the ceramic material is to be bonded must be malleable, of course, to be capable of being reduced by rolling. When a ceramic material was attempted to be bonded to a metal layer which was known to be non-malleable, the metal literally burst into small fragments from the reducing rolls.

Without utilizing means for forcing more ceramic material into the reducing rolls than the latter ordinarily will accept merely by providing an excess of ceramic material, layers of the latter up to 0.003 of an inch thick bonded to respective layers of metal 0.02 to 0.04 of an inch thick have been produced with total reductions of 85% where the respective metal layers before squeezing were one-quarter of an inch thick; these bonded ceramic material layers of the composite stock standing up without damage under severe mechanical working. With metal layers initially thicker than one-quarter of an inch, correspondingly thicker layers of ceramic material bonded to a layer of metal have been provided with total reductions of 85%.

In order to avoid the meticulous cleaning of the surface of the metal layer to be bonded to a ceramic material by the above-cited conventional methods, a base layer of ceramic material can first be bonded to the metal layer surface by the methods of this invention and subsequently additional ceramic material can be applied by conventional methods to the base layer of ceramic material without first cleaning the surface of the latter.

Illustrating to some extent the quality of the bond between a number of ceramic materials and metals provided by the reduction by rolling method of the invention are the following examples. Each of Pyrex (as identified above), black tourmaline, chrome oxide, talc, kaolin, magnesium oxide, aluminum oxide, silica and iron oxide was bonded to fine silver with a total reduction of 90% accomplished by two successive rolling passes, each of the samples having an overall thickness of 0.028 of an inch. A section of each of these samples was drawn to a depth of 0.138 of an inch with the punch against both the ceramic material surface and against the silver surface in an Erichsen ductility testing machine utilizing a punch in the form of a spherical ball one-half inch in diameter. With each of these sections the bond remained intact even though, in several cases, a slight amount of the ceramic material flaked off (but not down to the interface). Another section of each of these samples was heated in a furnace to a temperature of 1350° F. in an atmosphere of air for 10 minutes. Each of these annealed samples, upon cooling to room temperature, was subjected to the above-described drawing procedure, the samples being drawn to a depth of 0.231 of an inch, again with the punch against both the ceramic material surface and the fine silver surface; all without disruption of the bond. In each of the above- and below-described drawing steps, the depth of draw was preselected as an amount approaching but falling short of the extent which would result in rupture of the metal layer. Each of the above-named nine ceramic materials was also subjected to the same procedure except that aluminum was substituted for the fine silver and each of the samples was bonded with a total reduction of 93% in two successive rolling passes, each of these samples having an overall thickness of 0.020 of an inch. Unannealed sections of each of these latter samples were drawn with the punch against the ceramic material surface and against the aluminum surface to a depth of 0.095 of an inch. Sections of each of these latter samples after annealing at 1020° F. in air for two hours were drawn with the punch against both surfaces to a depth of 0.186 of an inch. All of these latter samples, annealed and unannealed, were successfully drawn to the extent indicated without disruption of the bond. As additional examples, S.A.E. 1010 steel was bonded to talc with a reduction of 84% by rolling in three passes to form a sample 0.023 of an inch thick, to chrome oxide with a reduction by rolling of 75% to form a sample 0.034 of an inch thick, to quartz with a reduction by rolling of 82% to form a sample 0.025 of an inch thick, and to aluminum oxide with a reduction by rolling of 74% to form a sample 0.036 of an inch thick. Sections of each of these samples were annealed at 1400° F. in air for one hour. Without disrupting the bond between the ceramic material and the steel, unannealed sections of each of the samples were drawn with the punch against both the ceramic material surface and the steel surface to a depth of 0.108 of an inch and the annealed sections of each of the samples were drawn with the punch against both surfaces to a depth of 0.206 of an inch.

Each of all of the samples named in the immediately preceding paragraph (and others including each of firebrick, commercial chinaware and pottery, and the cermet named above bonded to each of fine silver and aluminum to form respective samples approximately one-sixteenth of an inch thick) was bent back upon itself to form a sharp 180° bend. Although in certain cases some of the surface ceramic material flaked off at the bend of the respective samples, in no case did the ceramic at the bend flake off down to the interface of the ceramic material and metal and in every case the bond between the ceramic material and metal remained intact. This is believed to be clear proof of the fact that a true bond is achieved by the reduction by rolling method of this invention as distinguished, for example, from a mere mechanical interlocking between the components.

Particularly advantageous results have been obtained with composite stock formed of a layer of metal bonded to a layer of low temperature fusing glass enamel. By the term "low temperature fusing" glass enamel is meant such glass enamel which fuses at a substantially lower temperature than the metal layer to which it is or is to be bonded. Examples of such composite stock are a layer of a leaded glass enamel which fuses at 1400° F. bonded to a layer of fine silver, and another such enamel layer which fuses at 1020° F. bonded to a layer of either fine silver or aluminum. Numerous experiments were conducted using such composite stock which was formed by rolling together such a low temperature enamel and a layer of malleable metal with a total reduction in the order of 80% to 85%. Composite stock so bonded was successfully deep drawn, and/or otherwise mechanically worked into various shapes, and any cracks which developed in the enamel layer due to this severe mechanical working were readily repaired by heating the composite stock to at least the fusing point of the enamel but substantially below the melting point of the metal. The superiority of the bond and the apparent malleability of the ceramic material layer of the composite stock produced by the methods of this invention is indicated by comparing three samples, each of a low temperature fusing glass enamel bonded to a layer of metal and all three identical except that one is formed merely by fusing the enamel to the metal layer, another is formed merely by the reduction by rolling method as described above, and the remaining one is formed by the reduction by rolling method and subsequently fired to fuse the enamel. Both of the samples which are reduced by rolling according to the invention invariably withstand a much greater degree of mechanical working without loss of ceramic material and without disruption of the bond between the ceramic material and metal than does the one which was not reduced by rolling.

Separate and successive applications of low-temperature fusing glass enamels readily bond by fusing to each other, and this phenomenon is of substantial advantage in providing mechanically worked composite stock according to the invention with any additional thickness of glass enamel desired. That is, after bonding low-temperature fusing enamel to metal according to the methods of this invention and then mechanically working the composite stock into the desired shape and configuration, the thickness of the glass enamel layer can be increased to that desired or required in the finished product by applying additional low-temperature fusing enamel and heating the assembly to the fusion temperature of the ceramic material (but below the melting point of the metal, of course).

Among the many advantages of composite stock according to the invention is the one that no application of heat from an external source is required merely to achieve the bond. Also, the methods according to this invention lend themselves well to continuous production of comparatively long lengths of composite stock; non-fusible refractory ceramic material (such as firebrick) as well as fusible ceramic materials can be bonded to metal by the methods of the invention; the composite stock can be severely mechanically worked without disrupting the bond; composite stock of very close thickness tolerances can be provided because the reducing rolls can be adjusted to very fine tolerances; the ceramic material layer of the composite stock provides an excellent base for the bonding thereto of additional thicknesses of ceramic materials by conventional methods; by disposing ceramic material against the metal layer at areas spaced from each other (prior to the reduction by rolling) a resulting product can be provided which will have a plurality of mutually disconnected ceramic material areas, each of the ceramic material areas comprising a continuous layer bonded to the metal layer; and by the methods of this invention many different combinations of ceramic material bonded to metal can be provided which would otherwise be difficult or impossible to provide.

The composite stock of this invention is useful for a number of applications including electrical capacitors of which the ceramic material layer provides the dielectric, as vessels lined with ceramic material for containing substances which would otherwise attack the base metal, and in sheet form for use as building material (outside siding and interior wall paneling, for example). In addition to the preceding uses, glass-to-metal composite stock according to this invention presents a highly attractive appearance and is useful in forming items of jewelry such as cigarette lighter cases, bracelets, earrings, etc., and in forming glass-covered silverware and other metalware including bowls, plates, etc. Interesting and varied effects are achieved by providing the glass layer in multi-colored as well as in solid-colored and uncolored form.

Further to demonstrate the degree of mechanical workability and utility of composite stock according to the invention, a layer of low temperature fusing glass enamel was bonded to a layer of fine silver with a total reduction of over 85%. The bonded stock was then slit to provide an elongated strip which was bent into the form of a seamed tube one-half inch in diameter and with the glass layer outermost. This was drawn in wire-drawing dies to a diameter of 0.375 of an inch, fired at 1500° F. to fuse the enamel and further drawn down to a diameter of 0.150 of an inch. With the material at this size one section was fired at 1500° F. again to fuse the glass and another was not fired. In both cases the silver core remained bonded to and entirely covered with a layer of glass.

As is apparent from the context, the term "ceramic" is used herein in its broad sense to denote inorganic, non-metallic materials such as glass, oxides, silicates, etc.

In view of the above, it will be seen that the several objects of the invention are achieved and other advantageous results attained.

As many changes could be made in the above methods and structures without departing from the scope of the invention, it is intended that all matter contained in the above description or shown in the accompanying drawings, shall be interpreted as illustrative and not in a limiting sense.

I claim:

1. The method of making composite stock comprising the steps of providing a length of malleable metal, disposing against said length of metal a frangible ceramic material having a fusion temperature substantially below the melting point of said metal, squeezing the assembly with a sufficient reduction to form a layer of said ceramic material bonded to a layer of said metal, and then heating the bonded assembly to a temperature above said fusion temperature and below said melting point to fuse said ceramic.

2. The method comprising the steps of providing a length of malleable metal, disposing a frangible ceramic material against said length of metal, rolling the assembly with a sufficient reduction to provide a continuous layer of said ceramic material bonded to a layer of said metal, and then mechanically working the bonded assembly into the desired shape.

3. The method as set forth in claim 2 wherein said ceramic material is disposed against said length of metal by spraying.

4. The method as set forth in claim 2 wherein said rolling is carried out with a plurality of successive, cumulative reductions.

5. The method comprising the steps of providing a length of malleable metal, disposing against said length of metal a frangible ceramic material having a fusion temperature substantially below the melting point of said metal, rolling the assembly with a sufficient reduction in the absence of an external application of heat, to provide a continuous layer of said ceramic material bonded to a layer of said metal, mechanically working the bonded assembly into the desired shape and heating the bonded assembly to a temperature above said fusion temperature and below said melting point of the metal to fuse said ceramic material.

6. The method of making composite stock comprising the steps of providing a length of malleable metal; disposing frangible ceramic material in the form of integral sheets against said length of metal; squeezing the assembly with a sufficient reduction, in the absence of an external application of heat, to pulverize said ceramic material and form a continuous layer of said ceramic material bonded to a layer of said metal.

7. The method of making composite stock comprising the steps of providing a length of malleable metal; disposing against said length of metal, frangible ceramic material having a fusion temperature which does not exceed the melting temperature of said metal; rolling the assembly with a sufficient reduction to pulverize said ceramic material and provide a substantially continuous layer of said ceramic material bonded to a said layer of said metal, and then mechanically working the bonded assembly.

8. The method comprising the steps of providing a length of malleable metal, disposing against said length of metal, frangible ceramic material having a fusion temperature which is higher than the melting temperature of said metal; rolling the assembly with a sufficient reduction to provide a substantially continuous layer of said ceramic material bonded to a layer of said metal, and then mechanically working the bonded assembly.

9. The method for continuous production of composite stock in unlimited lengths comprising the steps of providing an unlimited length of malleable metal; disposing frangible ceramic material against said length of metal; squeezing the assembly with a sufficient reduction, in the absence of an application of heat from an external source, to pulverize said ceramic material and to form a substantially continuous layer of said ceramic material bonded to a layer of said metal, and then mechanically working the bonded assembly.

10. The method as set forth in claim 2 wherein said ceramic material is disposed against said length of metal by depositing the ceramic material in particulate form on a surface of said length of metal.

11. The method as set forth in claim 2 and wherein said ceramic material is disposed against said length of metal by depositing the ceramic material in fragmentary form on a surface of said length of metal.

12. The method as set forth in claim 2 and wherein said ceramic material is disposed against said length of metal by depositing the ceramic material in comminuted form on a surface of said length of metal.

13. The method as set forth in claim 2 and including the step of subsequently applying additional ceramic material of desired thickness to said bonded layer of ceramic material and adhering said additional ceramic material thereto.

References Cited in the file of this patent

UNITED STATES PATENTS

| | | |
|---|---|---|
| 936,389 | Wadsworth | Oct. 12, 1909 |
| 1,898,500 | Schulz | Feb. 21, 1933 |
| 2,004,567 | Brumbaugh | June 11, 1935 |
| 2,198,254 | Koehring | Apr. 23, 1940 |
| 2,286,759 | Patnode | June 16, 1942 |
| 2,337,588 | Calkins | Dec. 28, 1943 |
| 2,341,732 | Marvin | Feb. 15, 1944 |
| 2,424,353 | Essig | July 22, 1947 |
| 2,683,305 | Goetzel | July 13, 1954 |
| 2,724,526 | Russell | Nov. 22, 1955 |
| 2,725,617 | Sternberg | Dec. 6, 1955 |
| 2,775,531 | Montgomery | Dec. 25, 1956 |
| 2,788,317 | Sonnino | Apr. 9, 1957 |
| 2,811,750 | Cofek | Nov. 5, 1957 |
| 2,850,999 | Kaplan | Sept. 9, 1958 |
| 2,874,454 | Gullett | Feb. 24, 1959 |

FOREIGN PATENTS

| | | |
|---|---|---|
| 23,007 | Great Britain | Oct. 29, 1908 |
| 771,630 | Great Britain | Apr. 3, 1957 |